United States Patent [19]
Buer

[11] Patent Number: 6,067,027
[45] Date of Patent: May 23, 2000

[54] LOW POWER PLUG-IN CARD REMOVAL DETECTION

[75] Inventor: Mark Leonard Buer, Gilbert, Ariz.

[73] Assignee: VSLI Technology, Inc., San Jose, Calif.

[21] Appl. No.: 09/106,719

[22] Filed: Jun. 29, 1998

[51] Int. Cl.$^7$ .................................................. G08B 21/00
[52] U.S. Cl. ...................... 340/687; 340/649; 324/158.1; 711/115
[58] Field of Search ..................................... 340/687, 650, 340/649, 635; 711/100, 115; 324/158.1, 133

[56] References Cited

U.S. PATENT DOCUMENTS

| | | | |
|---|---|---|---|
| 5,304,987 | 4/1994 | Bunson et al. | 340/654 |
| 5,521,586 | 5/1996 | Takeshita | 340/635 |
| 5,705,976 | 1/1998 | Howard | 340/426 |
| 5,786,769 | 7/1998 | Coteus et al. | 340/687 |

*Primary Examiner*—Jeffery A. Hofsass
*Assistant Examiner*—Anh La
*Attorney, Agent, or Firm*—Douglas L. Weller

[57] ABSTRACT

A circuit on a detachable device, such as a plug-in card, determines when the detachable device has been disconnected from a host device. The circuit includes a node, a power source, a switch and a control circuit. The node is connected to ground when the detachable device is connected to the host device. The node is disconnected from ground when the detachable device is disconnected from the host device. The switch is for connecting and disconnecting the node to the power source. The control circuit is for, repeatedly at a predetermined interval of time while the detachable device remains connected to the host device, causing the switch to connect the node to the power source for a first length of time. The control circuit, at the end of the first length of time, checks a voltage level of the node in order to detect whether the detachable device has been disconnected from the host device.

20 Claims, 3 Drawing Sheets

LOW POWER PLUG-IN CARD REMOVAL DETECTION

BACKGROUND

The present invention concerns devices computer systems and pertains particularly to detection when a detachable device has been disconnected from a host device.

Detachable devices, such as plug-in cards, are used to provide additional functionality to computer systems or other host devices. For example, plug-in cards can provide additional memory, additional communication capability and/or additional processing capability to a portable computer or a personal digital assistant (PDA).

For proper performance, it is often desirable for a plug-in card to detect when the plug-in card has been disconnected from the host system. This is done, for example, by monitoring a first end of a resistor. A second end of the resistor is connected to the voltage (VBattery) supplied by the battery internal to the plug-in card. When the plug-in card is connected to a card slot within a computer or other device, the first end of the resistor is connected to a ground by the card slot within the computer and thus the voltage level of the first end of the resistor is at 0 volts. When the plug-in card is disconnected to the computer, the first end is open. In this case the voltage on the first end of the resistor floats to VBattery.

While this is an effective way to detect whether a plug-in card is connected or disconnected to a host device, the drain of current through the resistor can shorten the battery life of the battery within the plug-in card.

SUMMARY OF THE INVENTION

In accordance with the preferred embodiment of the present invention, a circuit on a detachable device, such as a plug-in card, determines when the detachable device has been disconnected from a host device. The circuit includes a node, a power source, a switch and a control circuit. The node is connected to ground when the detachable device is connected to the host device. The node is disconnected from ground when the detachable device is disconnected from the host device. The switch is for connecting and disconnecting the node to the power source. The control circuit is for, repeatedly at a predetermined interval of time while the detachable device remains connected to the host device, causing the switch to connect the node to the power source for a first length of time. The control circuit, at the end of the first length of time, checks a voltage level of the node in order to detect whether the detachable device has been disconnected from the host device.

In the preferred embodiment, when the voltage level of the node indicates the detachable device has been disconnected from the host device, the control circuit refrains from connecting the node to ground until the detachable device has been reconnected to the host device.

For example, the control circuit includes a first counter, a second counter, a register, a compare circuit and a state machine. The first counter periodically generates a signal which indicates the predetermined interval has passed. A value is stored in the register which indicates the first length of time. The compare circuit indicates when a count value in the second counter is equal to the value stored in the register. The state machine, in response to the first counter generating the signal which indicates the predetermined interval has passed, starts the second counter. In the preferred embodiment, the control circuit additionally includes a flip-flop which is used to store a value which indicates the voltage level of the node.

Also, in the preferred embodiment, the switch is a pull-up transistor, and the predetermined interval of time is on the order of one second.

The present invention significantly reduces the power dissipation required by a circuit which monitors connection to a host device. The present invention provides for extreme flexibility in configuration for maximum conservation of power within the detachable device. This is accomplished by allowing the amount of time required to charge the capacitance associated with the node to be user selected through a value placed in a register. This flexibility also allows the charge time to take into account a high impedance switch and a slow charging time of the node, thus allowing additional power conservation.

DESCRIPTION OF THE PREFERRED EMBODIMENT

Figure 1:
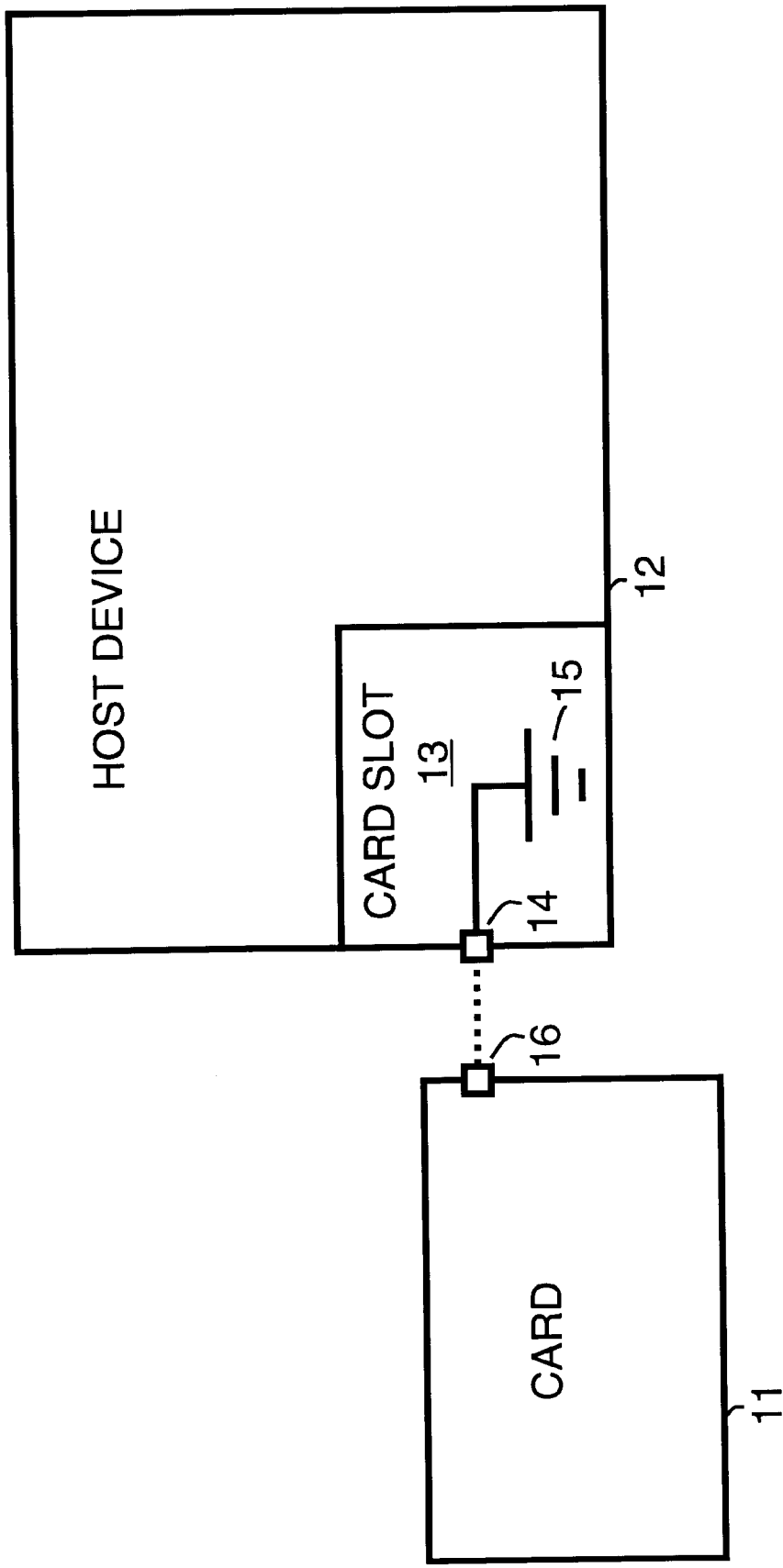
FIG. 1 is a simplified block diagram which illustrates connection between a plug-in card and a host device in accordance with a preferred embodiment of the present invention.

FIG. 1 is a simplified block diagram which illustrates connection between a detachable device, such as a plug-in card 11, and a host device 12. A detector connector 16 of the plug-in card 11 comes into connection with a detector connector 14 within a card slot 13 of host device 12. Detector connector within card slot 13 is connected to a ground 15, which allows card 11 to detect when detector connector (node) 16 of plug-in card 11 is connected to a detector connector 14.

Figure 2:
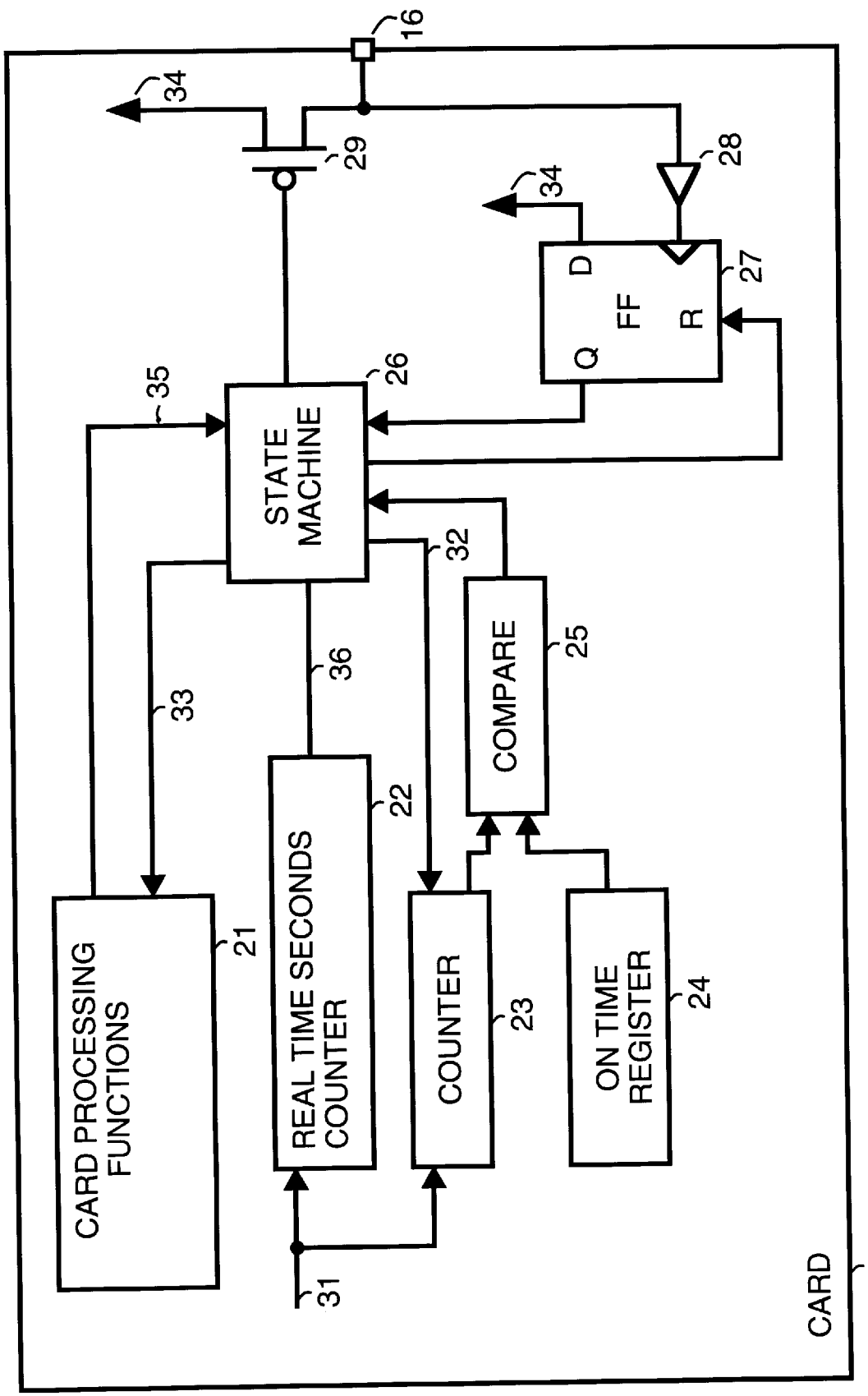
FIG. 2 is a simplified block diagram of circuitry within a plug-in card which monitors connection to a host device in accordance with a preferred embodiment of the present invention.

FIG. 2 is a simplified block diagram of plug-in card 11. The logic on plug-in card 11 is used to determine if plug-in card 11 has been removed from card slot 13 of host device 12. Plug-in card 11 logic will function under battery power when the power connections with host device 12 is broken because plug-in card 11 has been removed from card slot 13 of host device 12.

A real time seconds counter 22 is used, at one second intervals, to signal a state machine block 26 to perform sampling. An on-time register 24 is programmed by a user, e.g., through processing block 21 on plug-in card 11, to ensure that the amount of time a pull-up transistor 29 is turned on is long enough to charge all of the capacitance on plug-in card 11. When pull-up transistor 29 is turned on, power source 34 of plug-in card 11 is used to charge capacitance associated with node 16 of plug-in card 11. Because the value in on-time register 24 is programmable, this allows for compensation when a very high impedance is chosen for pull-up transistor 29 thus allowing for further reduction in power consumption of the circuit.

A clock input of a delay (D) flip-flop 27 is connected through an amplifier 28 to detector connector 16 of plug-in card 11. Detector connector 16 of plug-in card 11 is pulled up when pull-up transistor is turned on so that a valid transition from low to high will be stored by D flip-flop 27 as a removal event. As shown, the D input of D flip-flop 27 is connected to power source 34 of plug-in card 11.

Once the removal event has been stored in D flip-flop 27, state machine 26 will signal processing block 21 through a signal line 33 that the removal state has been detected. Alternatively, processing block 21 can directly sample the Q output of flip-flop 27. State machine 26 will stop sampling detector connector 16 of plug-in card 11 until the removal state is cleared from D flip-flop 27. By stopping the sampling once the removal state has been detected, the only power that will be dissipated by the battery of plug-in card 11 will be two cycles of removal detection worst case. When the removal state is cleared from D flip-flop 27, state machine 26 is enabled by enable signal 35 and state machine 26 resets flip-flop 27.

When plug-in card 11 is inserted into card slot 13 of host device 12, the power source of host device 12 can be used to provide power for the circuitry on card slot 13. Therefore, the circuit only uses battery power of card slot 13 one time once plug-in card 11 is removed from card slot 13 of host device 12. If removal plug-in card 11 from card slot 13 of host device 12 occurs during a sampling period, a second sampling period may be required to detect the removal has occurred.

The value in on-time register 24 sets out the amount of time that pull-up transistor 29 is active. The value in on-time register 24 denotes the number of 32 kHz clock periods of a clock signal 31 that pull-up transistor 29 will be active for a sampling period. A one hertz (Hz) signal 36 from real time seconds counter 22 to state machine 26 is used to initiate a sampling period. The sampling period is started when the state machine detects one Hz signal 36 from real time seconds counter 22 is active and a removal event has not yet been detected (i.e., the value stored in flip-flop 27 is still equal to logic zero). Counter 23 is cleared when not sampling, thus the value in counter 23 will be zero when the sampling period starts. State machine 26 pulls increment signal 32 high (logic one) in order to start counter 23. State machine 26 continues to hold the increment signal 32 high until a compare circuit 25 indicates the value in counter 23 is equal to the value in on-time register 24. State machine 26 then clears counter 23 and waits until the next sampling period.

Figure 3:
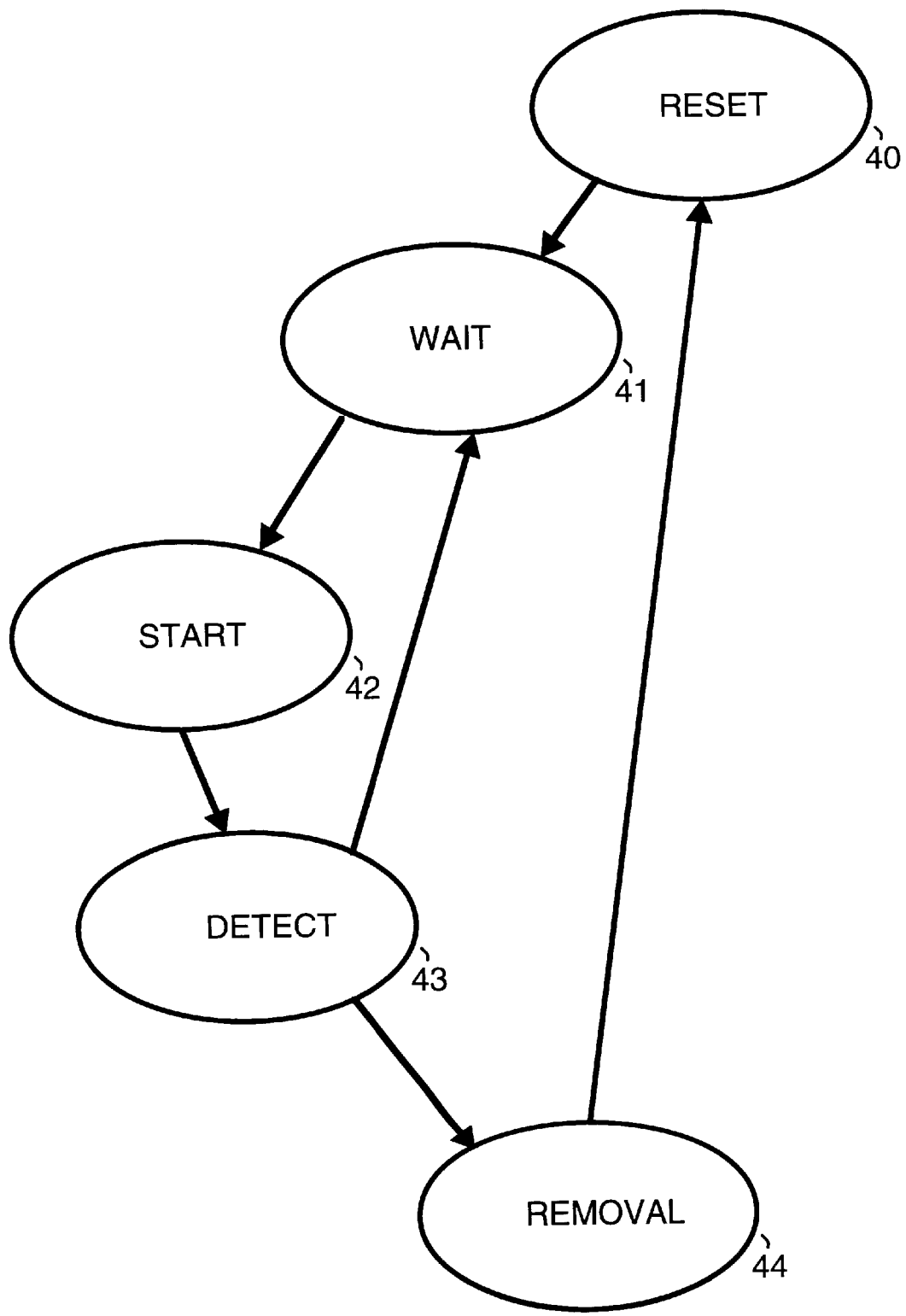
FIG. 3 is a simplified state diagram for a state machine within circuitry within a plug-in card which monitors connection to a host device in accordance with a preferred embodiment of the present invention.

FIG. 3 is a simplified state diagram for state machine 26. When state machine 26 is first enabled through enable line 35, state machine 26 enters an initiate state 40. In reset state 40, state machine 26 resets flip-flop 27. State machine then enters a wait state 41.

In wait state 41, state machine 26 waits for assertion of one Hz signal 36 from real time seconds counter 22. When one Hz signal 36 is asserted, state machine 26 enters a start state 42. In start state 22, state machine 26 pulls increment signal 32 high to start counter 23. State machine 26 remains in start state 22 until compare circuit 25 indicates the value in counter 23 is equal to the value in on-time register 24. Then state machine 26 enters a detect state 43.

In detect state 43, state machine 26 checks the Q output of D flip-flop 27 to detect if one time plug-in card 11 has been removed from card slot 13 of host device 12. If the value of the Q output of D flip-flop 27 is equal to logic zero, state machine 26 returns to wait state 41. If the value of the Q output of D flip-flop 27 is equal to logic one, state machine 26 goes to a removal state 44. Before leaving detect state 43, state machine 26 clears the value in counter 23 and disables counter 23.

In removal state 44, state machine 33 signals processing block 21 that one time plug-in card 11 has been removed from card slot 13 of host device 12. State machine 26 remains in removal state 44 until re-enabled by processing block 21. When state machine 26 is re-enabled by processing block 21, state machine enters initiate state 40.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for detecting when a detachable device has been disconnected to a host device comprising the following steps:

(a) when the detachable device is connected to the host device, connecting a first node to ground;

(b) when the detachable device is not connected to the host device, disconnecting the first node from ground; and (c) while the detachable device remains connected to the host device, repeating performance of the following substeps at a predetermined interval of time:

(c.1) for a first length of time, connecting the node through a high impedance to a power source of the detachable device, and (c.2) at the end of the first length of time, checking a voltage level of the node in order to detect whether the detachable device has been disconnected from the host device.

2. A method as in claim 1, additionally comprising the following step:

(d) when the voltage level of the node indicates the detachable device has been disconnected from the host device, ceasing to perform substeps (c.1) and (c.2) until the detachable device has been reconnected to the host device.

3. A method as in claim 1, wherein substep (c.1) includes storing the voltage level of the node in a flip-flop.

4. A method as in claim 1, wherein in substep (c.1) the first length of time is determined by a value stored in a register.

5. A method as in claim 1, wherein in substep (c.1) a pull-up transistor is used to connect the node to the power source of the detachable device.

6. A method as in claim 1, wherein in step (c) the predetermined interval of time is on the order of one second.

7. A circuit on a detachable device which determines when the detachable device has been disconnected from a host device, the circuit comprising:

a node, the node being connected to ground when the detachable device is connected to the host device, and the node being disconnected from ground when the detachable device is disconnected from the host device;

a power source;

a switch for connecting and disconnecting the node to the power source; and, a control circuit for, repeatedly at a predetermined interval of time while the detachable device remains connected to the host device, causing the switch to connect the node to the power source for a first length of time, and the control circuit being for at the end of the first length of time, checking a voltage level of the node in order to detect whether the detachable device has been disconnected from the host device.

8. A circuit as in claim 7, wherein when the voltage level of the node indicates the detachable device has been disconnected from the host device, the control circuit refrains from connecting the node to ground until the detachable device has been reconnected to the host device.

9. A circuit as in claim 7, wherein the control circuit includes a flip-flop which is used to store a value which indicates the voltage level of the node.

10. A circuit as in claim 7, wherein in the control circuit includes a register in which is stored a value which indicates the first length of time.

11. A circuit as in claim 7, wherein the switch is a pull-up transistor.

12. A circuit as in claim 7, wherein the predetermined interval of time is on the order of one second.

13. A circuit as in claim 7 wherein the control circuit comprises:
 a first counter which periodically generates a signal which indicates the predetermined interval has passed;
 a second counter;
 a register in which is stored a value which indicates the first length of time;
 a compare circuit which indicates when a count value in the second counter is equal to the value stored in the register; and,
 a state machine which in response to the first counter generating the signal which indicates the predetermined interval has passed, starting the second counter.

14. A circuit as in claim 13, wherein the control circuit additionally comprises a flip-flop which is used to store a value which indicates the voltage level of the node.

15. A detachable device comprising:
 a circuit which determines when the detachable device has been disconnected from a host device, the circuit comprising:
  a node, the node being connected to ground when the detachable device is connected to the host device, and the node being disconnected from ground when the detachable device is disconnected from the host device;
  a power source;
  a switch for connecting and disconnecting the node to the power source; and,
  a control circuit for, repeatedly at a predetermined interval of time while the detachable device remains connected to the host device, causing the switch to connect the node to the power source for a first length of time, and the control circuit being for at the end of the first length of time, checking a voltage level of the node in order to detect whether the detachable device has been disconnected from the host device.

16. A detachable device as in claim 15, wherein when the voltage level of the node indicates the detachable device has been disconnected from the host device, the control circuit refrains from connecting the node to ground until the detachable device has been reconnected to the host device.

17. A detachable device as in claim 15, wherein the control circuit includes a flip-flop which is used to store a value which indicates the voltage level of the node.

18. A detachable device as in claim 15, wherein the switch is a pull-up transistor.

19. A detachable device as in claim 15 wherein the control circuit comprises:
 a first counter which periodically generates a signal which indicates the predetermined interval has passed;
 a second counter;
 a register in which is stored a value which indicates the first length of time;
 a compare circuit which indicates when a count value in the second counter is equal to the value stored in the register; and,
 a state machine which in response to the first counter generating the signal which indicates the predetermined interval has passed, starting the second counter.

20. A detachable device as in claim 15, wherein the control circuit additionally comprises a flip-flop which is used to store a value which indicates the voltage level of the node.

* * * * *